United States Patent
Topcu et al.

(10) Patent No.: US 10,186,942 B2
(45) Date of Patent: Jan. 22, 2019

(54) METHODS AND APPARATUS FOR DISCHARGING A NODE OF AN ELECTRICAL CIRCUIT

(71) Applicant: Dialog Semiconductor (UK) Limited, Reading (GB)

(72) Inventors: Emre Topcu, Istanbul (TR); Turev Acar, Istanbul (TR); Kemal Ozanoglu, Istanbul (TR)

(73) Assignee: Dialog Semiconductor (UK) Limited, Reading (GB)

( * ) Notice: Subject to any disclaimer, the term of this patent is extended or adjusted under 35 U.S.C. 154(b) by 613 days.

(21) Appl. No.: 14/596,450

(22) Filed: Jan. 14, 2015

(65) Prior Publication Data

US 2016/0204687 A1  Jul. 14, 2016

(51) Int. Cl.
| | |
|---|---|
| H02M 1/08 | (2006.01) |
| G05F 3/26 | (2006.01) |
| G05F 1/613 | (2006.01) |
| H02M 3/156 | (2006.01) |
| H02M 1/32 | (2007.01) |

(52) U.S. Cl.
CPC .............. H02M 1/08 (2013.01); G05F 1/613 (2013.01); G05F 3/262 (2013.01); H02M 3/156 (2013.01); H02M 2001/322 (2013.01)

(58) Field of Classification Search
CPC ............ G05F 3/30; G05F 1/613; H02M 1/08; H02M 3/156; H02M 2001/322
See application file for complete search history.

(56) References Cited

U.S. PATENT DOCUMENTS

| | | | | |
|---|---|---|---|---|
| 4,937,469 A | * | 6/1990 | Larson | G05F 3/262 |
| | | | | 326/21 |
| 4,947,063 A | * | 8/1990 | O'Shaughnessy | H03K 17/163 |
| | | | | 326/103 |
| 5,113,129 A | * | 5/1992 | Hughes | G11C 27/028 |
| | | | | 323/316 |
| 5,304,918 A | * | 4/1994 | Khieu | G05F 1/567 |
| | | | | 323/303 |
| 5,311,071 A | * | 5/1994 | Ueda | G01R 19/16519 |
| | | | | 327/63 |
| 5,572,159 A | * | 11/1996 | McFarland | G05F 1/466 |
| | | | | 327/276 |
| 5,617,051 A | * | 4/1997 | Bingham | H03F 3/45076 |
| | | | | 326/27 |

(Continued)

OTHER PUBLICATIONS

German Office Action, File No. 10 2015 223 114.3, Applicant: Dialog Semiconductor (UK) Limited, dated Jul. 12, 2018, 12 pages, and English language translation, 10 pages.

*Primary Examiner* — Yusef A Ahmed
(74) *Attorney, Agent, or Firm* — Saile Ackerman LLC; Stephen B. Ackerman

(57) ABSTRACT

A node that stores a charge is discharged in two phases, starting with a current controlled phase where a current mirror sink controls the current sunk from the node, and then moving to a second phase where a resistive discharge is provided. A pull down device such as a transistor switches from its saturation mode in the first phase to its linear mode in the second phase. a discharge circuit implementing this method provides optimized area and control for the discharge process as compared with approaches that rely solely on current mirroring or resistive discharging.

12 Claims, 4 Drawing Sheets

(56) References Cited

U.S. PATENT DOCUMENTS

| | | | | |
|---|---|---|---|---|
| 5,650,753 A * | 7/1997 | Ling | H03F 1/3217 | |
| | | | 330/253 | |
| 5,656,960 A * | 8/1997 | Holzer | H03K 19/00361 | |
| | | | 327/108 | |
| 5,770,954 A * | 6/1998 | Tomasini | G05F 3/262 | |
| | | | 327/63 | |
| 5,808,460 A * | 9/1998 | Wei | F02B 33/40 | |
| | | | 323/315 | |
| 5,856,749 A * | 1/1999 | Wu | H03F 3/303 | |
| | | | 323/316 | |
| 5,959,446 A * | 9/1999 | Kuckreja | G05F 3/262 | |
| | | | 323/315 | |
| 6,417,702 B1 * | 7/2002 | Wang | G05F 3/262 | |
| | | | 327/103 | |
| 6,586,980 B1 * | 7/2003 | Callahan, Jr. | G05F 3/262 | |
| | | | 327/132 | |
| 6,798,250 B1 * | 9/2004 | Wile | G01R 19/0092 | |
| | | | 327/51 | |
| 7,075,353 B1 * | 7/2006 | Wan | G06F 1/04 | |
| | | | 327/295 | |
| 7,075,360 B1 * | 7/2006 | Holloway | G05F 3/262 | |
| | | | 327/513 | |
| 7,119,612 B1 * | 10/2006 | Holloway | H03F 1/02 | |
| | | | 330/253 | |
| 7,639,089 B2 * | 12/2009 | Lee | H03L 7/0895 | |
| | | | 327/112 | |
| 9,523,994 B2 * | 12/2016 | Cheong | G05F 3/262 | |
| 2001/0052811 A1 * | 12/2001 | Kim | H03L 7/0895 | |
| | | | 327/536 | |
| 2003/0017809 A1 * | 1/2003 | Garlepp | H04B 1/0003 | |
| | | | 455/87 | |
| 2003/0184274 A1 * | 10/2003 | Comer | G05F 3/262 | |
| | | | 323/315 | |
| 2004/0042539 A1 * | 3/2004 | Vishakhadatta | H04B 1/0003 | |
| | | | 375/216 | |
| 2004/0145361 A1 * | 7/2004 | Owen | G05F 3/262 | |
| | | | 323/313 | |
| 2004/0189362 A1 * | 9/2004 | Callahan, Jr. | H03K 4/502 | |
| | | | 327/170 | |
| 2004/0263144 A1 * | 12/2004 | Tseng | G05F 3/262 | |
| | | | 323/313 | |
| 2005/0226051 A1 * | 10/2005 | Bedarida | G05F 3/262 | |
| | | | 365/185.18 | |
| 2006/0113972 A1 * | 6/2006 | Mihara | G05F 1/575 | |
| | | | 323/273 | |
| 2007/0139120 A1 * | 6/2007 | Luo | H03F 1/30 | |
| | | | 330/296 | |
| 2009/0121759 A1 * | 5/2009 | Wang | H03L 7/0896 | |
| | | | 327/157 | |
| 2011/0018621 A1 * | 1/2011 | Butzmann | G05F 3/262 | |
| | | | 327/543 | |
| 2011/0199125 A1 * | 8/2011 | Han | H03K 3/35613 | |
| | | | 327/74 | |
| 2011/0316519 A1 * | 12/2011 | Schie | H03K 17/166 | |
| | | | 323/351 | |
| 2013/0057175 A1 * | 3/2013 | Chuang | G05F 3/262 | |
| | | | 315/240 | |
| 2013/0162358 A1 * | 6/2013 | Xiao | G05F 3/242 | |
| | | | 331/66 | |
| 2014/0312963 A1 * | 10/2014 | Berkhout | G05F 3/262 | |
| | | | 327/543 | |
| 2015/0261248 A1 * | 9/2015 | Sambucco | G05F 3/30 | |
| | | | 323/316 | |
| 2016/0043636 A1 * | 2/2016 | Bass | H03L 7/0895 | |
| | | | 327/157 | |
| 2016/0252924 A1 * | 9/2016 | Masoumi | H03K 17/165 | |
| | | | 323/313 | |
| 2016/0294384 A1 * | 10/2016 | Schindler | H03K 17/04123 | |

\* cited by examiner

METHODS AND APPARATUS FOR DISCHARGING A NODE OF AN ELECTRICAL CIRCUIT

TECHNICAL FIELD

The present disclosure relates to a discharger circuit, and in particular to circuits and methods for discharging a node such as a capacitor.

BACKGROUND

Nodes may need to be discharged in various circumstances, such as when a device or circuit is shut down or changes state.

It is known to discharge a node by coupling a resistance across the node's terminals. However, if the capacitance at the discharge node is too large, peak current can be too high. Furthermore, a node generally needs to be discharged before expiry of a particular time period, so compliance with these time specifications limits a resistor's size and therefore the size of capacitance that can be discharged.

A node may also be discharged using a current mirror sink, which involves using an input current to control current at the node being discharged. The current mirror approach is more controlled and has a linear slew at the discharge node. However it requires a very large silicon area.

Therefore, there is a need to provide an improved discharge circuit that can cope with relatively large node capacity, while also maintaining an element of control.

SUMMARY OF THE DISCLOSURE

According to a first aspect of the disclosure, there is provided a method of discharging a node, comprising a first phase in which a current mirror sink discharges the node, and a second phase wherein a resistive discharge is applied.

Optionally, a transition from the first phase to the second phase is governed by an output device which is coupled with the node.

Optionally, the output device comprises a transistor that changes from a linear mode of operation in the first phase to a saturation mode of operation in the second phase.

Optionally, the transistor has a resistance that varies during the first phase.

Optionally, the coupling of the output device and the node comprises a direct electrical connection.

Optionally, the coupling of the output device and the node comprises an application of a gain factor to the node voltage.

Optionally, the coupling of the output device and the node comprises an application of an offset to the node voltage.

Optionally, the coupling of the output device and the node comprises the application of a gain factor and an offset to the node voltage.

Optionally, the method comprises varying a bias current and/or transfer ratio of a mirror to account for different node capacitance sizes.

According to a second aspect of the disclosure, there is provided a circuit for discharging a node, comprising: a current source; mirror circuitry that mirrors a bias current from the current source to a pull down device coupled with the node; and an output device that is coupled between the current source and the mirror circuitry, and is coupled with the node; wherein the output device transitions between a first state in which the mirror circuitry discharges the node and a second state in which the node is discharged by the resistance of the pull down device.

Optionally, the output device functions as a variable resistor while in the first state.

Optionally, the output device comprises a transistor.

Optionally, the output device is coupled directly with the node.

Optionally, a coupling between the output device and the node comprises components that apply a gain to the node discharge voltage.

Optionally, a coupling between the output device and the node comprises components that apply an offset to the node discharge voltage.

Optionally, a coupling between the output device and the node comprises components that apply a gain and an offset to the node discharge voltage.

BRIEF DESCRIPTION OF THE DRAWINGS

The disclosure will be described below, by way of example only, with reference to the accompanying drawings, in which.

DETAILED DESCRIPTION

A discharger circuit according to the present disclosure combines resistive and current mirror sink approaches to provide a solution that is optimised in terms of area and controllability.

Figure 1:
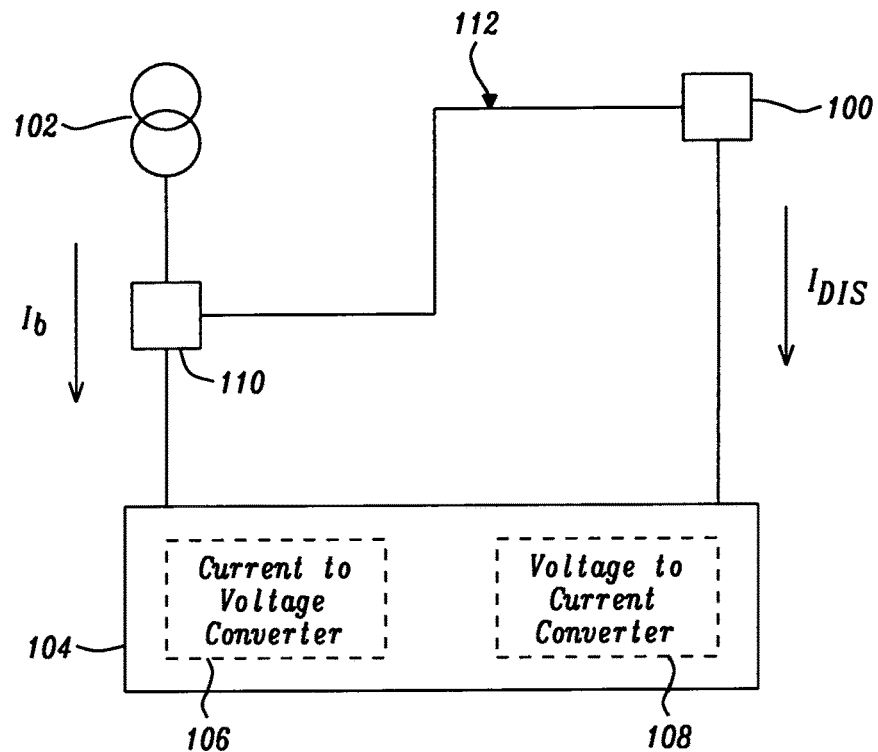
FIG. 1 shows a high level illustration of a circuit for discharging a node, according to an embodiment of the present disclosure.

FIG. 1 shows a circuit for discharging a node 100 which has or may have a stored charge. The circuit comprises a current source 102 which provides a bias current Ib and mirror circuitry 104 which sinks a discharge current IDIS from the node 100. The mirror circuitry may in preferred embodiments comprise a current-to-voltage converter 106 and a voltage-to-current converter 108. The voltage-to-current converter 108 acts as a pull down device which mirrors a current input to the mirror circuitry 104 according to a transfer function. The transfer function may for example define a multiplication factor that is applied to the original current, with a factor of one representing a replication of the same current, and other factors representing positive or negative current gains that may be applied by the mirror circuitry 104.

The circuit also comprises an output device 110. This is coupled between the current source 102 and the mirror circuitry 104, and is also coupled with the node 100. The output device transitions between a first state in which the mirror circuitry 104 discharges the node 100 and a second state in which the node 100 is discharged by the resistance of a pull down device (such as voltage-to-current converter 108) of the mirror circuitry 104. The output device 102 may comprise a transistor, such as a BJT, PMOS or NMOS transistor, which in the first state acts in its linear mode to, and in its second state operates in saturation mode.

The coupling 112 may be a direct coupling between the output device 110 and the node 100; or an optional tracker circuit 208 may be provided. As explained in more detail below, this optional tracker circuit 208 may comprise components that apply a gain and/or an offset to the discharge voltage VDIS.

In its linear mode, the output device 110 may act like a variable resistor, with its gate voltage being driven by its coupling 112 with the node 100. In this first state, the node 100 is discharged with a current mirror sink as provided by the circuitry 104. When the output device 110 transitions from its linear mode to its saturation mode, the current mirror sink stops operating and the node 100 is discharged by the resistance of the pull down device 108.

The circuit may be selectively enabled. It should be enabled when a device or other system of which the node 100 is part of is switched off or changes in state.

Thus, in contrast to discharging the node 100 only with a current mirror sink or only with a resistive device, the present disclosure provides an intelligent discharge method that uses a hybrid of current mirroring and resistive discharging. This provides an improved optimisation between area and controllability.

Figure 2:
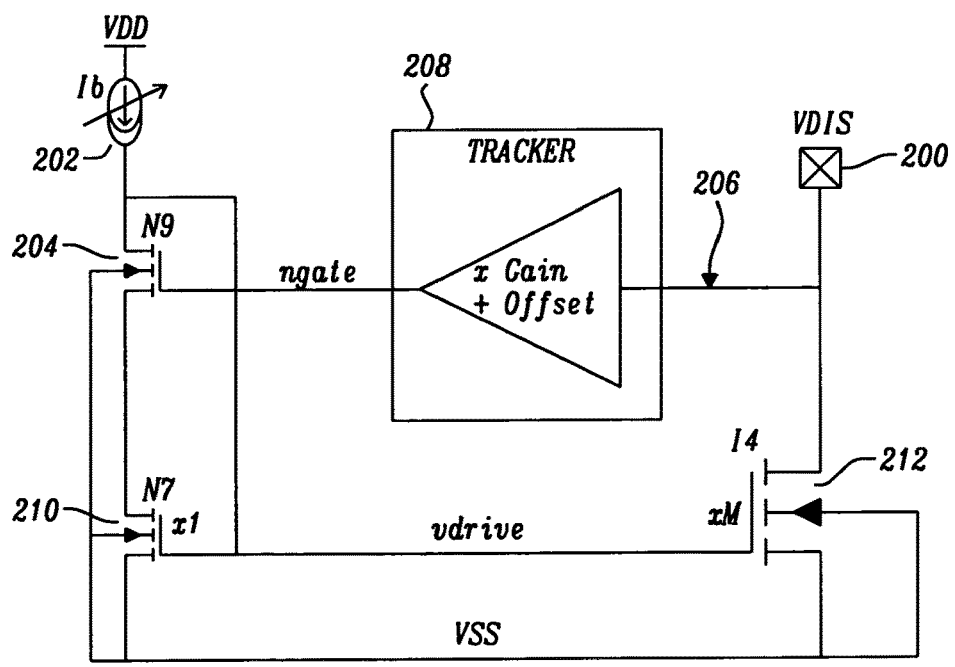
FIG. 2 shows an illustrative circuit schematic showing a further embodiment of a circuit for discharging a node.

FIG. 2 shows an example embodiment of a discharger circuit, for discharging a node 200. The node 200 has a discharge voltage VDIS. The discharger circuit comprises a current source 202 which provides a bias current Ib from a supply voltage VDD, and an output device 204 which in this embodiment comprises an N-channel MOSFET N9. An input of the output device 204 (here, the gate of the MOSFET N9) is coupled with the discharge voltage via a coupling 206. The coupling 206 may be a direct coupling between the input and the discharge voltage VDIS, or an optional tracker circuit 208 may be provided. As explained in more detail below, this optional tracker circuit 208 may comprise components that apply a gain and/or an offset to the discharge voltage VDIS.

At the start of a discharging process, the node 200 is highly charged and therefore the discharge voltage VDIS is high. The output device 204 has a high gate voltage, ngate, as it is coupled with the high discharge voltage VDIS. At the start of a discharge process, we assume that the gate-source voltage VGS of the output device 204 is greater than its drain-source voltage VDS. The applied voltage may also be modified by a gain in cases where an optional tracker circuit 208 includes components for applying a gain to the discharge voltage VDIS.

Therefore, as the gate-source voltage of the output device 204 is greater than its drain-source voltage, the output device 204 will be in its linear mode of operation and will act like a small resistor. This means that active element 210 (N7) acts like a diode-connected device because its gate is shorted to its drain (via the resistance provided by N9), and the bias current Ib is mirrored to the pull down device 212 (14).

A coupling 206 is provided between the discharge voltage VDIS and the gate of the output device 204. This means that the resistance of the output device 204 is controlled by a function of the discharge node voltage VDIS, acting like a variable resistor.

As the gate voltage (ngate) of the output device 204 decreases, the resistance of the output device 204 will increase, so the drain current of active element 210 decreases, which means a higher drive voltage vdrive for the pull down device 212. This increase of the drive voltage (vdrive) of the pull down device 212 enhances the duration of a constant current sink mode where the discharge is well controlled by the current mirroring. Over time, the discharge voltage VDIS decreases and the pull down device 212 transitions from its saturation region (mode of operation) to its linear region (mode of operation). Increasing the drive voltage vdrive means that much more current can be sunk from the node 200. This is not a well-controlled constant current, but it extends the current sink capability.

When the pull down device 212 drive voltage (vdrive) reaches the supply voltage VDD of the current source 202, the output device 204 transitions from the linear region to the saturation region. The active element 210 will also remain in its saturation region as its gate is shorted to its drain, and so the remaining charge on the node 200 will be discharged by the resistance of the pull down device 212.

The disclosure provides for two phases of operation in a discharge process; a constant current phase and a resistive discharge phase. However it is possible in preferred optional embodiments to have three phases of operation. The first in a discharge sequence is a constant current phase, wherein the pull down device 212 drive voltage (vdrive) remains substantially constant and the current sunk from the discharge node remains constant and well controlled. Then, in a second optional phase, the current sink capability is extended. As explained above, during this phase the pull down device 212 drive voltage (vdrive) starts to increase which maintains a high level of current being sunk from the discharge node. A final phase comprises a resistive discharge, where the node is discharged by a resistance, provided when the pull down device transitions from its saturation region to its linear region.

The discharger circuit can be configured for different discharge node capacitor sizes and timing specifications by programming the bias current Ib and changing the transfer function of the current mirror. The transfer function can be selected at the time of manufacture of the circuit, and the bias current can be changed as (and if) desired after manufacture.

There are various ways of realizing the tracker circuit and the present disclosure is not limited to any one particular arrangement. For illustration, some example embodiments are shown in FIGS. 3 to 8.

Figure 3:
FIGS. 3 to 8 illustrate various embodiments of a tracker circuit which may be used in the circuit illustrated in FIG. 2.
Figure 4:
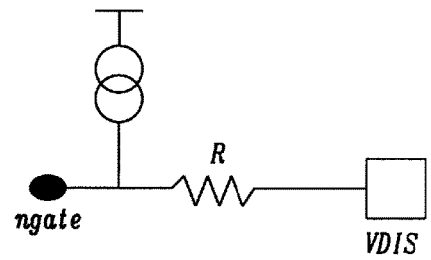
Figure 5:
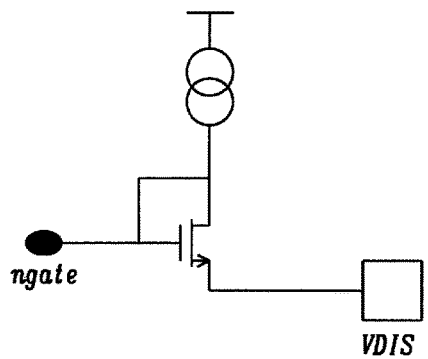
Figure 6:
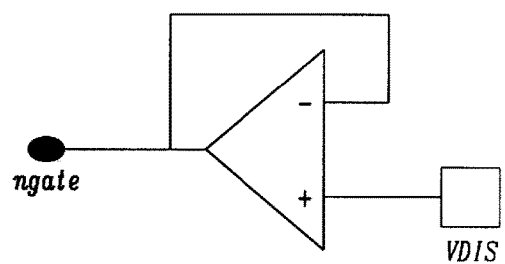
Figure 7:
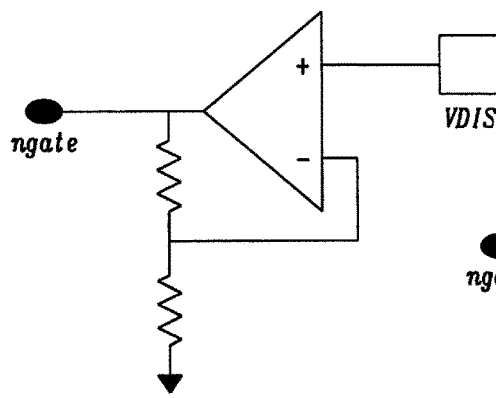
Figure 8:
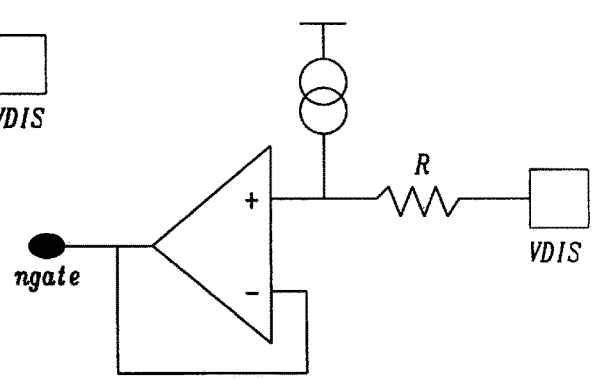

FIG. 3 shows the simplest option, where there is a direct connection between VDIS and ngate. FIG. 4 shows an embodiment where a simple offset is provided. FIG. 5 shows an embodiment comprising a diode connected N channel transistor with a current source. FIG. 6 shows a buffer, FIG. 7 shows a buffer with gain and FIG. 8 shows a buffer with an offset.

Figure 9:
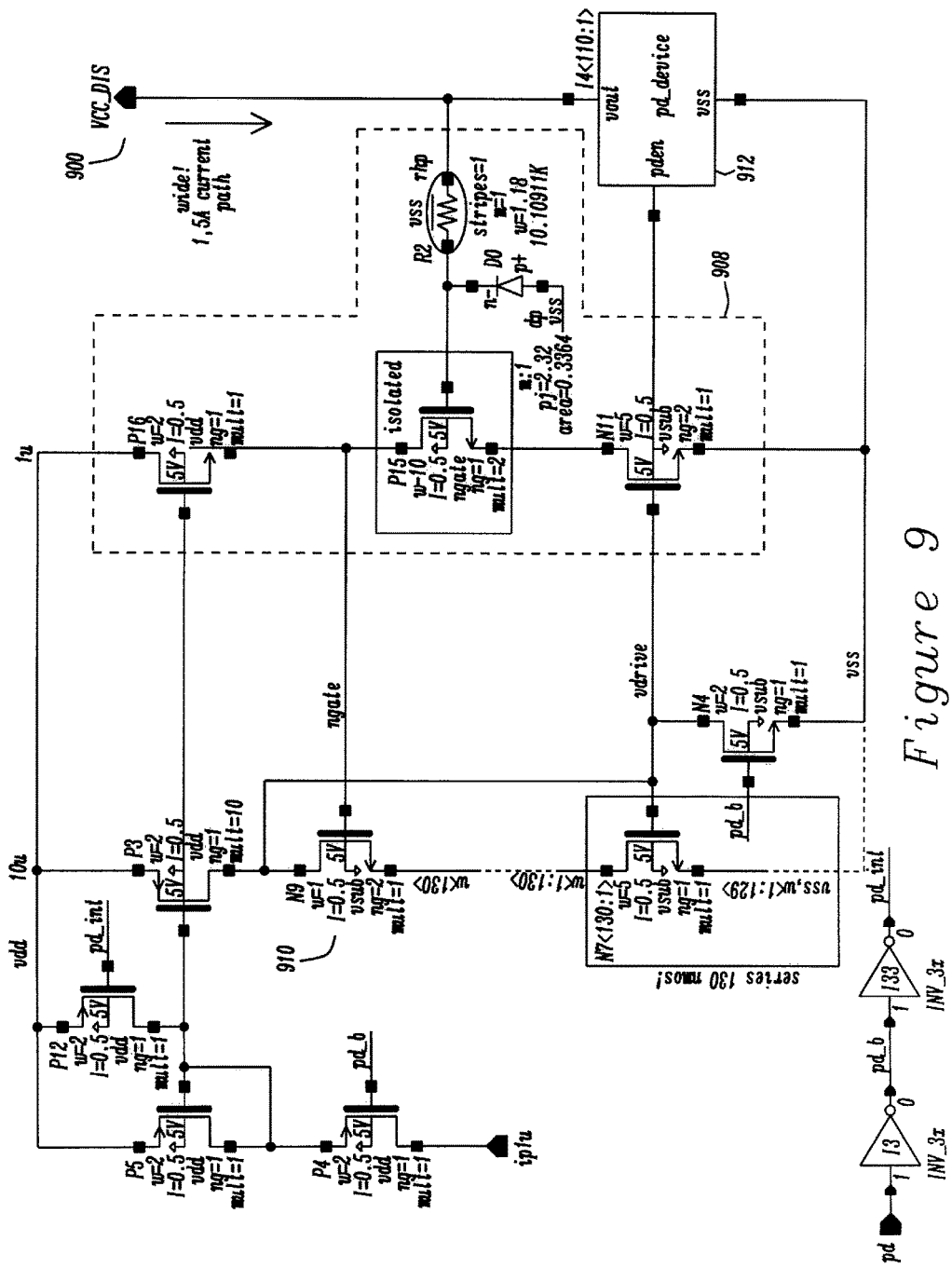
FIG. 9 shows a further embodiment of a discharge circuit according to the disclosure.

FIG. 9 shows a further embodiment of a discharge circuit according to the disclosure, for discharging a node 900. Here, a source follower with a PMOS transistor is used as a tracker circuit. The circuit comprises an output device 910 (N9); tracker circuit 908 (comprising devices P15, P16, N11, R2 and D0—note that N11 is optional—it could be omitted and the drain of P15 connected direct to VSS. Also note that R2 and D0 are provided for electrostatic discharge protection rather than being part of the tracking function); power down devices P4,P12,N4 which prevent current flow when the circuit is not in use; and an active device P5 that sets up a bias for current sources P3 and P16. A pull down device 912 is also provided.

Figure 10:
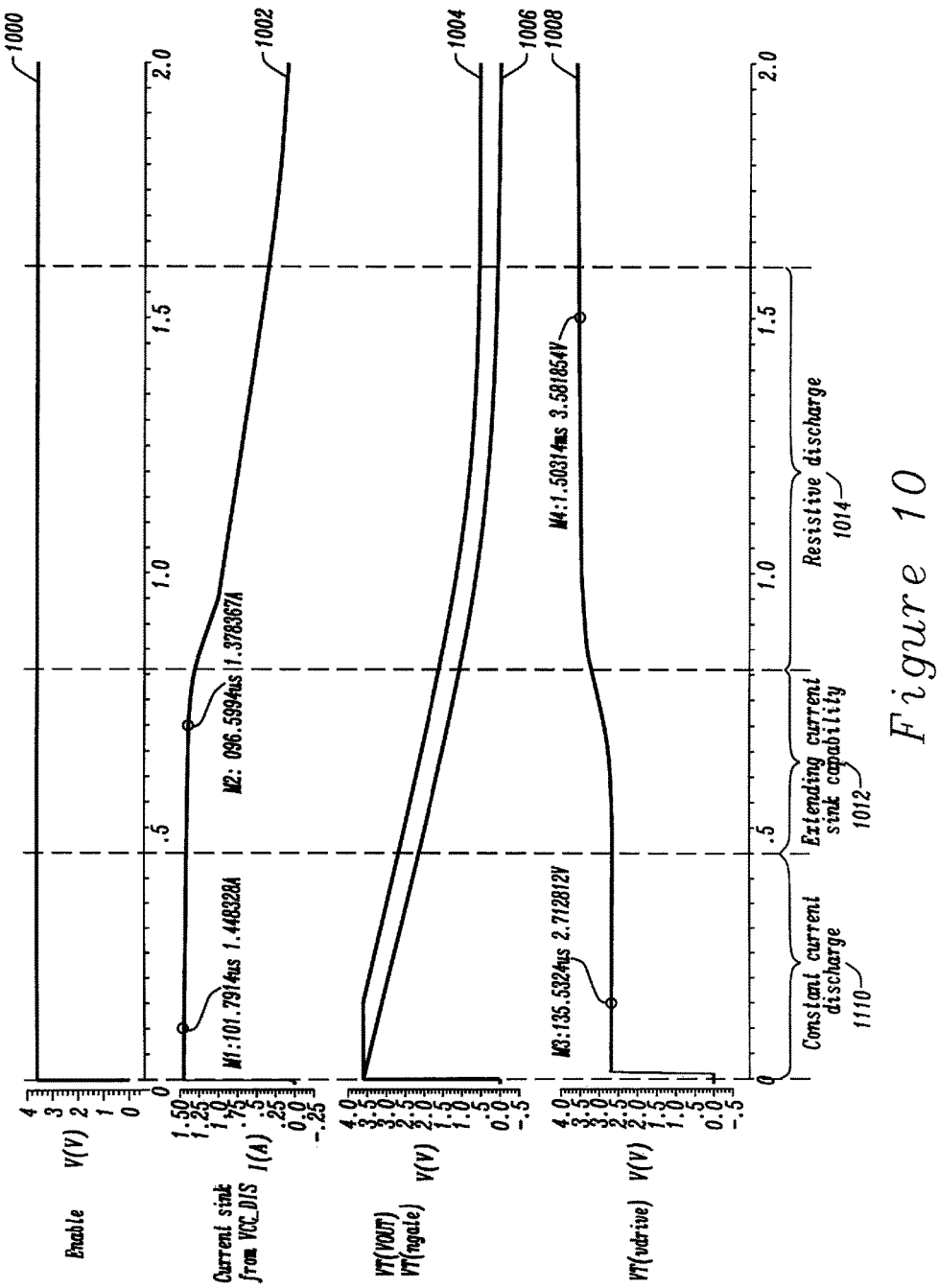
FIG. 10 shows an example waveform of the internal nodes of the circuit of FIG. 9.

An example waveform of the internal nodes of the circuit is given in FIG. 10. The figure plots an enable signal 1000 (measured in volts) used to commence operation of the discharge circuit. The enable signal 1000 goes high when a node needs to be discharged. The figure also shows the graphs: 1002 showing current sunk from the discharge node (amps); 1006 showing VOUT (volts); 1004 showing output device gate voltage, ngate (volts); and 1008 showing the driven gate voltage of the pull down device (vdrive) (volts). All graphs are plotted over time.

The figure also shows the discharge phases as discussed above; including a constant current discharge phase 1110, an extended current sink phase 1112, and a resistive discharge phase 1114.

The disclosure provides various advantages compared with existing node discharge methods. The peak discharge current is limited. A lower initial/peak discharge current allows narrower metal usage in the integrated circuit and on the printed circuit board carrying the discharge circuit, and also less ball/pin usage. However, a fast discharge can still be achieved. A large mirror ratio allows high discharge current ratings with the cost of less quiescent current. In the example of FIG. 10, N7 and the pull down devices, burn 10 uA while sinking 1.5 A from the discharge node.

A constant sink current is on during the majority of the discharge duration, so this provides control for the discharge timing specification. The dynamic biasing allows for a relatively reduced area while still providing constant current. It is also simple to adjust the peak current limit.

The disclosure may apply to the discharge of any large storage node or capacitor, where fast discharge is required but the maximum current has to be limited for current handling or power dissipation reasons. While not limited to these devices, the disclosure may be of particular interest for use at the output of low dropout regulators and switching converters if the output voltage is pulled down when the block turns off. Accordingly, low dropout regulators, switching converters or other devices comprising a discharge circuit according to any of the above-described embodiments may be provided according to the present disclosure.

Various modifications and improvements can be made to the above without departing from the scope of the disclosure.

The invention claimed is:

1. A method of discharging a node, comprising:
    a first discharging phase in which a current mirror sink provides current mirror sinking to partially discharge the node, wherein said current mirror sinking comprises receiving an input bias current from a current source and sinking a mirrored discharge current from the node, the mirrored discharge current being defined in relation to the input bias current by a transfer function;
    a second discharging phase wherein the current mirror sinking stops operating and a resistive discharge is applied;
    wherein the node is discharged after completion of the second discharging phase;
    the second discharging phase occurs after the first discharging phase;
    a transition from the first discharging phase to the second discharging phase is governed by an output device which is coupled with the node; and
    the output device comprises a transistor that changes from a linear mode of operation and functioning as a variable resistor in the first discharging phase to a saturation mode of operation in the second discharging phase.

2. The method of claim 1, wherein the transistor has a resistance that varies during the first discharging phase.

3. The method of claim 1, wherein the coupling of the output device and the node comprises a direct electrical connection.

4. The method of claim 1, wherein the coupling of the output device and the node comprises an application of a gain factor to the node voltage.

5. The method of claim 1, wherein the coupling of the output device and the node comprises an application of an offset to the node voltage.

6. The method of claim 1, wherein the coupling of the output device and the node comprises the application of a gain factor and an offset to the node voltage.

7. The method of claim 1, comprising varying a bias current and/or transfer ratio of a mirror to account for different node capacitance sizes.

8. A circuit for discharging a node, comprising:
    a current source;
    mirror circuitry that mirrors an input bias current from the current source to a pull down device coupled with the node, wherein said mirror circuitry is configured to receive the input bias current from the current source and sink a mirrored discharge current from the node, the mirrored discharge current being defined in relation to the input bias current by a transfer function;
    an output device that is coupled between the current source and the mirror circuitry, and is coupled with the node; wherein
    the output device is arranged to transition between a first discharging phase in which the mirror circuitry provides current mirror sinking to partially discharge the node and a second discharging phase in which the current mirror sinking stops operating and a resistance provided by the pull down device discharges the node;
    wherein the node is discharged after completion of the second discharging phase; and
    the second discharging phase occurs after the first discharging phase; and wherein the output device comprises a transistor which operates in a linear mode of operation and functions as a variable resistor while in the first discharging phase and which operates in a saturation mode of operation in the second discharging phase.

9. The circuit of claim 8, wherein the output device is coupled directly with the node.

10. The circuit of claim 8, wherein a coupling between the output device and the node comprises components that apply a gain to the node discharge voltage.

11. The circuit of claim 8, wherein a coupling between the output device and the node comprises components that apply an offset to the node discharge voltage.

12. The circuit of claim 8, wherein a coupling between the output device and the node comprises components that apply a gain and an offset to the node discharge voltage.

* * * * *